United States Patent
Wolverton et al.

(10) Patent No.: US 10,364,873 B1
(45) Date of Patent: Jul. 30, 2019

(54) TORQUE CONVERTER STATOR HAVING INTERCHANGEABLE BLADES

(71) Applicants: Ronald Wayne Wolverton, Mary Esther, FL (US); Christopher Bradly Posadas, Mary Esther, FL (US)

(72) Inventors: Ronald Wayne Wolverton, Mary Esther, FL (US); Christopher Bradly Posadas, Mary Esther, FL (US)

( * ) Notice: Subject to any disclaimer, the term of this patent is extended or adjusted under 35 U.S.C. 154(b) by 194 days.

(21) Appl. No.: 15/726,310

(22) Filed: Oct. 5, 2017

(51) Int. Cl.
  *F16H 41/28* (2006.01)
  *F16H 41/26* (2006.01)
  *F16H 61/52* (2006.01)
  *F16D 33/04* (2006.01)

(52) U.S. Cl.
  CPC ............ *F16H 41/28* (2013.01); *F16D 33/04* (2013.01); *F16H 41/26* (2013.01); *F16H 61/52* (2013.01); *F16H 2041/285* (2013.01)

(58) Field of Classification Search
  CPC .... F16H 41/28; F16H 61/52; F16H 2041/285; F16D 33/04; F01D 9/042
  See application file for complete search history.

(56) References Cited

U.S. PATENT DOCUMENTS

| | | | | |
|---|---|---|---|---|
| 1,470,500 A | * | 10/1923 | Steenstrup | F01D 5/225 416/213 R |
| 2,199,243 A | * | 4/1940 | Mortimer | F01D 5/225 416/217 |
| 2,478,306 A | * | 8/1949 | Palmer | F16H 41/28 29/889.5 |
| 3,192,862 A | * | 7/1965 | Schrader, Jr. | F16H 41/26 416/180 |
| 3,572,034 A | * | 3/1971 | Fisher | F16H 41/28 415/191 |
| 7,661,924 B2 | * | 2/2010 | Wassynger | F01D 5/3007 415/137 |
| 7,854,588 B2 | * | 12/2010 | George | F16H 41/26 415/189 |

FOREIGN PATENT DOCUMENTS

GB          778667 A   *   7/1957   ........... F04D 29/322

* cited by examiner

*Primary Examiner* — Thomas E Lazo
(74) *Attorney, Agent, or Firm* — Peter Loffler

(57) ABSTRACT

A torque converter stator has interchangeable blades and has a body member with a central hub and an annular wall. Dovetail openings are located on an outer surface of the annular wall. Each blade has a dovetail pin that is removably received within a respective one of the dovetail openings. A cover plate is removably attached to the body member in order to secure the blades in place within their respective dovetail openings. A heated duct ring is positioned over the outer ends of the blades and allowed to heat shrink into contact with these ends as the duct ring cools and shrinks, thereby securing the duct ring to the remainder of the stator.

6 Claims, 8 Drawing Sheets

TORQUE CONVERTER STATOR HAVING INTERCHANGEABLE BLADES

BACKGROUND OF THE INVENTION

1. Field of the Invention

The present invention relates to a torque converter stator that is of modular construction and that employs blades and a ducting ring that are each detachable from the hub, allowing the blades to be interchangeable so that the number of blades, the blade pitch and/or blade material can be changed as needed for a specific application for which the torque converter is tasked.

2. Background of the Prior Art

The torque converter of a vehicle or similar type of transmission is a hydraulic coupler between the engine and transmission of the vehicle. In its simplest terms, the task of the torque converter is to transmit fluid from the impeller or pump portion of the torque converter, the pump connected to the engine, to the turbine of the torque converter, the turbine connected to the transmission input shaft. The fluid within the torque converter travels in a spiral motion around the inside of the converter. After the fluid leaves the pump, the fluid travels through the turbine torque converter due to centrifugal force. After leaving the turbine, the fluid travels through the stator and back to the pump. The shape of the blades of the stator determines how the fluid returns to the pump. The rate of returning fluid to the pump affects the stall rpm or speed of the engine and efficiency (percentage of slip) of the torque converter. The stall speed is the maximum engine rpm achieved before the vehicle starts to move while efficiency is how well the torque converter converts the engine rpm to the transmission input shaft rpm.

Historically, in order to change the stall speed, the stator was typically modified. Stators could be somewhat mixed and matched from a variety of stock applications so that stock cast aluminum stators of various designs would be tested, essentially in trial and error fashion, until the desired stall speed of the engine was achieved. Once the desired stator was identified, it might have been fine-tuned using a milling machine to optimize results. While such trial and error stator selection methodology was modestly effective, the selection process did not permit tuning of the stator beyond the cast stators available. Over time, people were able to successfully fashion their own stator from aluminum or steel by welding in flat blades into the stator assembly. With the advent of CNC machining, designers were able to fashion lightweight aluminum stators using the CNC machines. The stators so created where lightweight and customized to the desired specifications, but required expensive 4 and 5 axis milling machines for complicated blade designs, which made such stator designs cost-prohibitive to many designers. Additionally, the aluminum central core was unable to support the power of ever more powerful engines. As CNC machines have become more sophisticated, steel stators have gained favor to handle the power of modern racing engines. While effective in their application, steel centered stators are heavy in deployment and are very labor-intensive to create. Additionally, such stators cannot be reconfigured whenever a situation, such as retuning or swap out of an engine, occurs. In such situations, a new stator must be created and installed.

What is needed is a stator that can be custom created for a specific application using relatively inexpensive 3-axis CNC milling machines. Such a stator must be able to have a strong center hub portion to help prevent it from shearing off during high pressure applications. Ideally, the center hub of the stator as well as its blades, are made from lightweight materials in order to keep rotating mass low. The stator should be reconfigurable as needed for a specific application.

SUMMARY OF THE INVENTION

The torque converter stator having interchangeable blades of the present invention addresses the aforementioned needs in the art by providing a relatively simple and straightforward system that allows strong materials (stronger than aluminum) to be used for the hub portion and that has lightweight blades in order to maintain a relatively low rotating mass of the stator. The torque converter stator having interchangeable blades can to be reconfigured for a specific task at hand without the need to completely replace the stator. The torque converter stator having interchangeable blades is of relatively simple design and construction, being produced using standard manufacturing techniques, specifically via the use of simple 3-axis machining, so as to be cost-effective to produce. The torque converter stator having interchangeable blades requires little to no modifications of the existing torque converter into which the stator is installed.

The torque converter stator having interchangeable blades of the present invention is comprised of a body member that has a central hub and an annular wall. The annular wall has an outer surface such that a series of spaced apart dovetail openings are located on the outer surface of this annular wall. Each dovetail opening has a mouth defining an entrance into the dovetail opening. A series of blades are provided, each having a dovetail pin and an outer end. Each dovetail pin is slid into a respective one of the dovetail openings on the body member through the dovetail opening's mouth so that when the dovetail pin is fully received within its dovetail opening, the dovetail pin is held thereat in dovetail fashion. A duct ring has an inner wall and is removably attached to the outer end of each of the series of blades by having the inner wall contact each of the ends of the series of blades. A cover plate is removably attached to the body member such that the cover plate overlays the mouth of each of the series of dovetail openings in order to prevent the dovetail pins from sliding out of their respective dovetail opening. Each of the series of blades can be made from aluminum or titanium. The duct ring can be made from aluminum or titanium. The cover plate can be made from aluminum or titanium. The body member can be made from steel, aluminum, or titanium.

BRIEF DESCRIPTION OF THE DRAWINGS

Similar reference numerals refer to similar parts throughout the several views of the drawings.

DESCRIPTION OF THE PREFERRED EMBODIMENT

Figure 1:
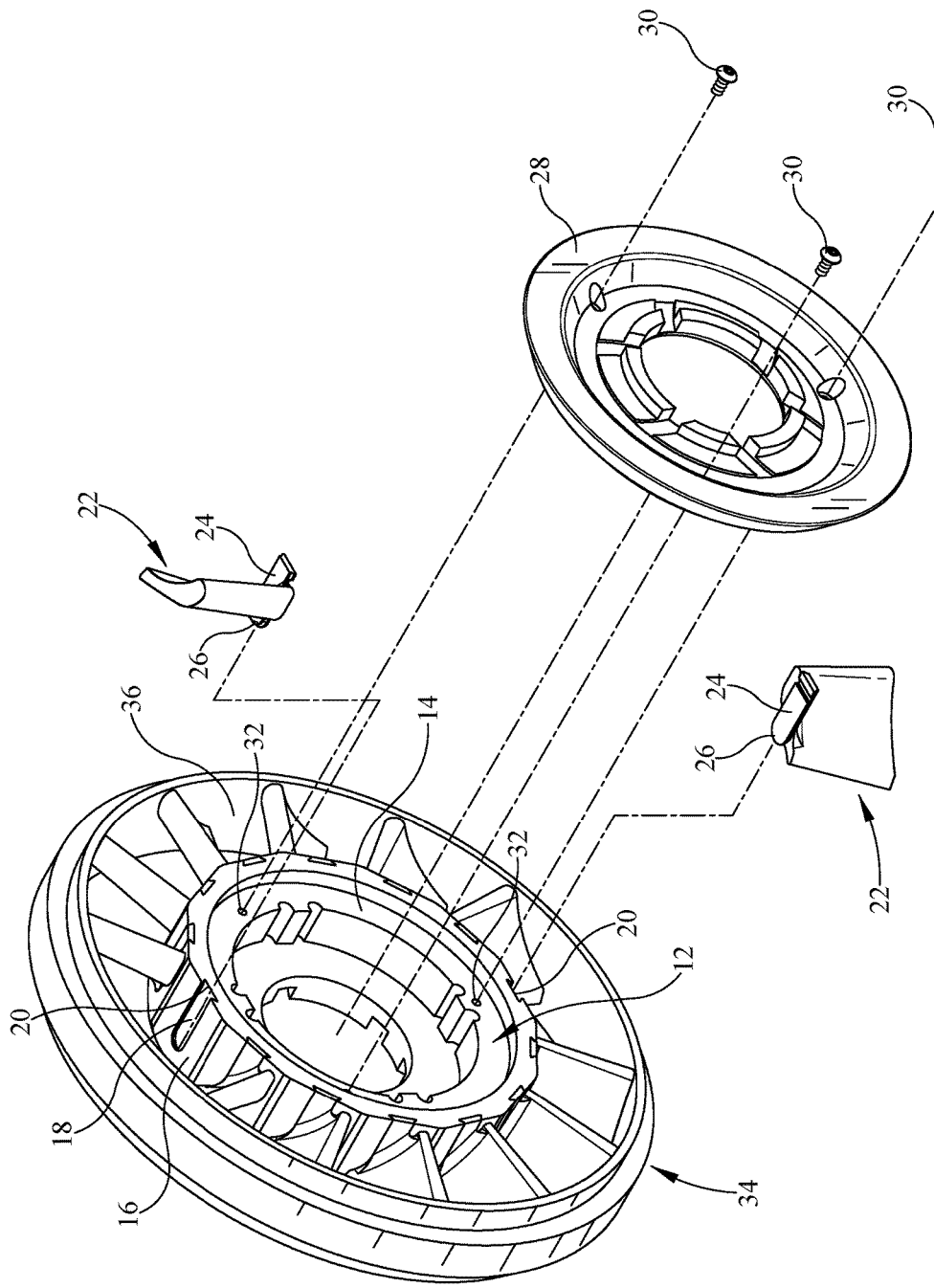
FIG. 1 is a perspective view, partially exploded, of the torque converter stator having interchangeable blades of the present invention.
Figure 2:
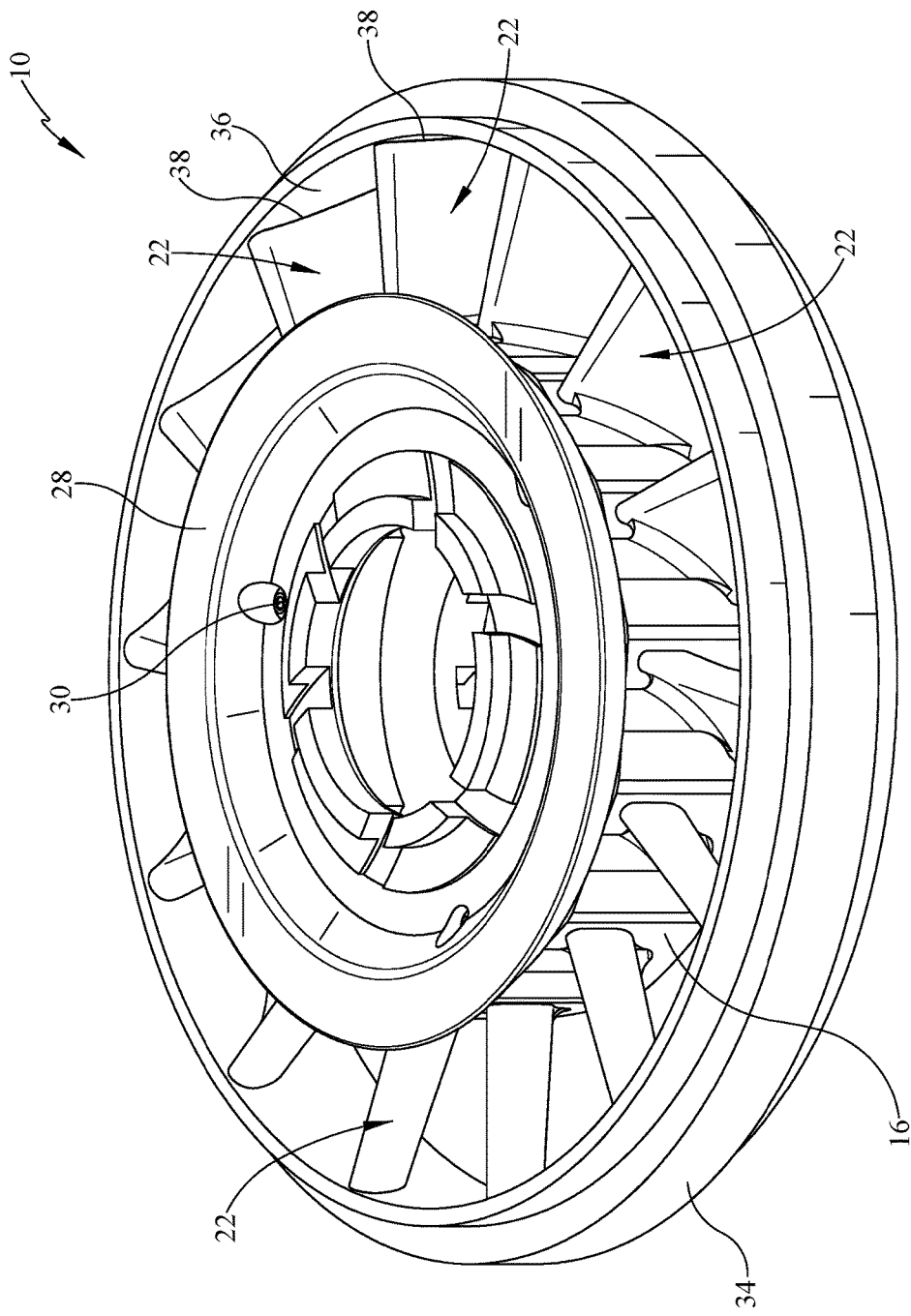
FIG. 2 is a lower perspective view of the torque converter stator having interchangeable blades.
Figure 3:
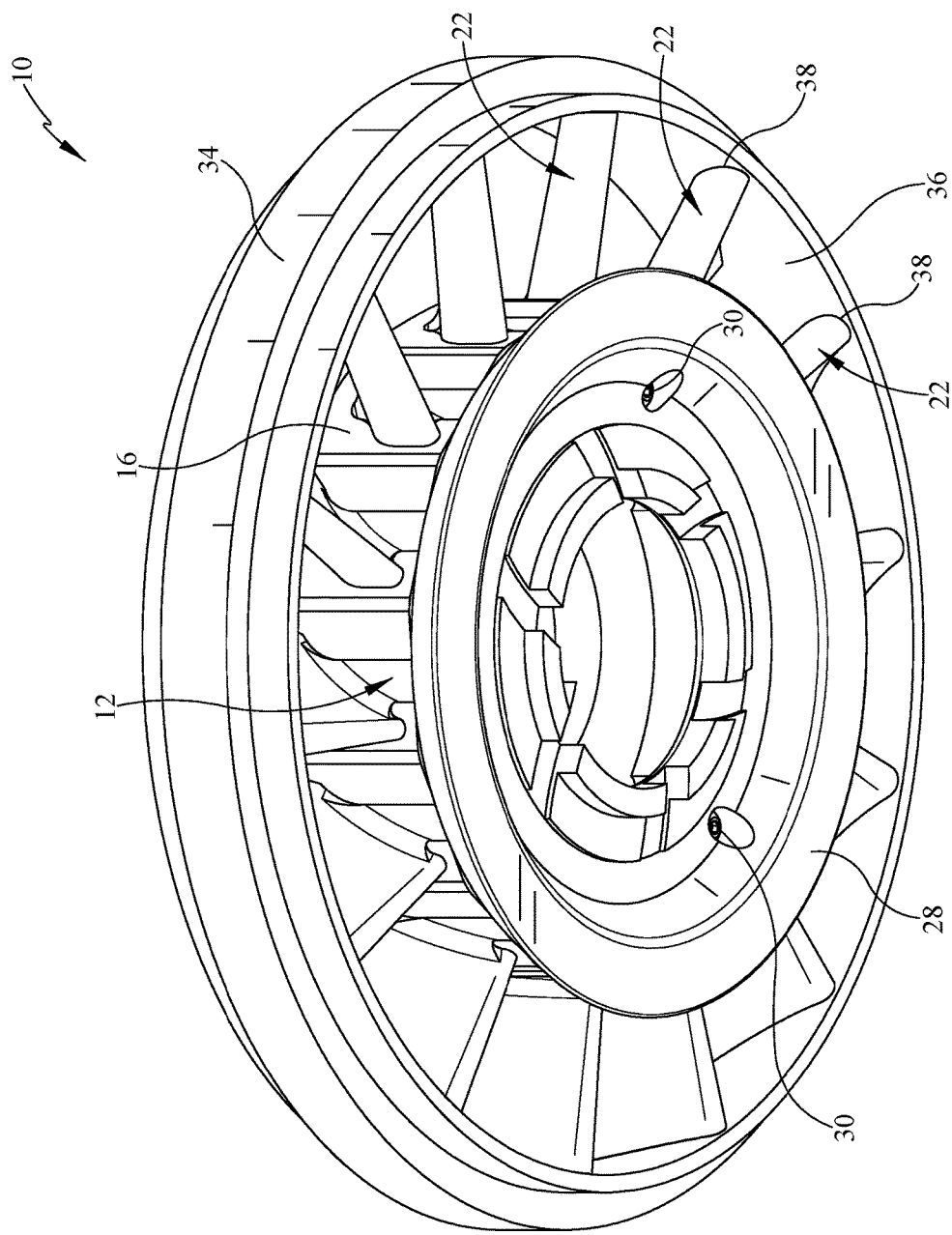
FIG. 3 is an upper perspective view of the torque converter stator having interchangeable blades.
Figure 4:
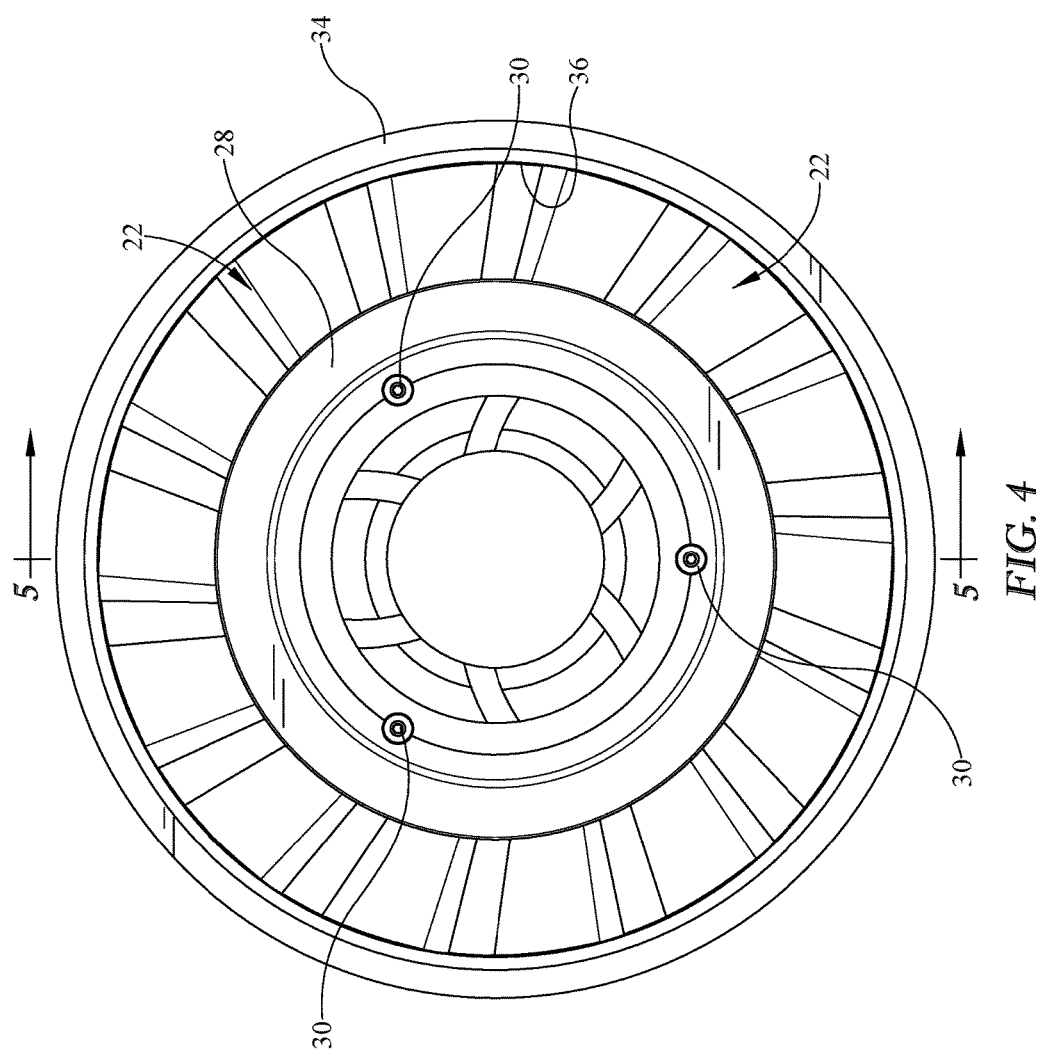
FIG. 4 is a top plan view of the torque converter stator having interchangeable blades.
Figure 5:
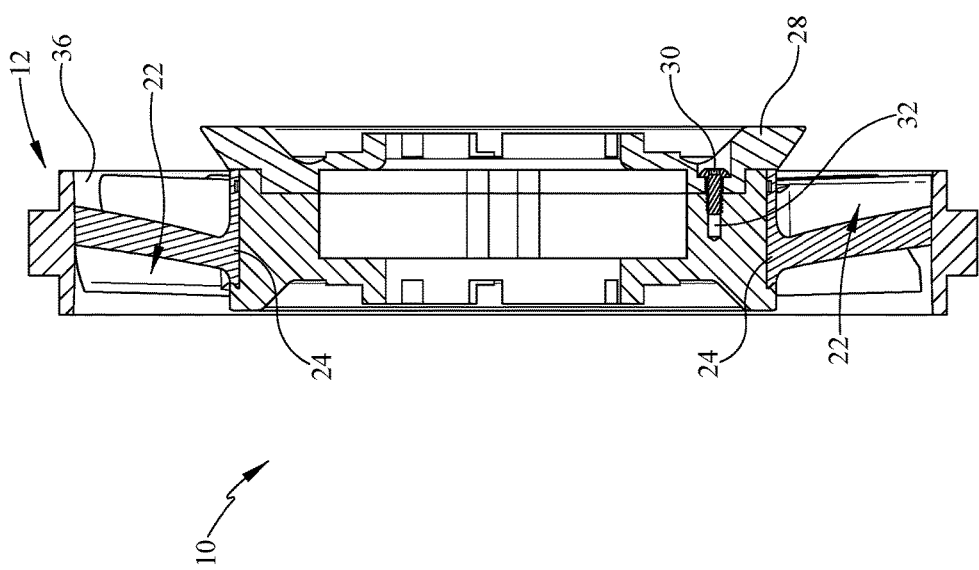
FIG. 5 is a sectioned view of the torque converter stator having interchangeable blades taken along line 5-5 in FIG. 4.
Figure 6:
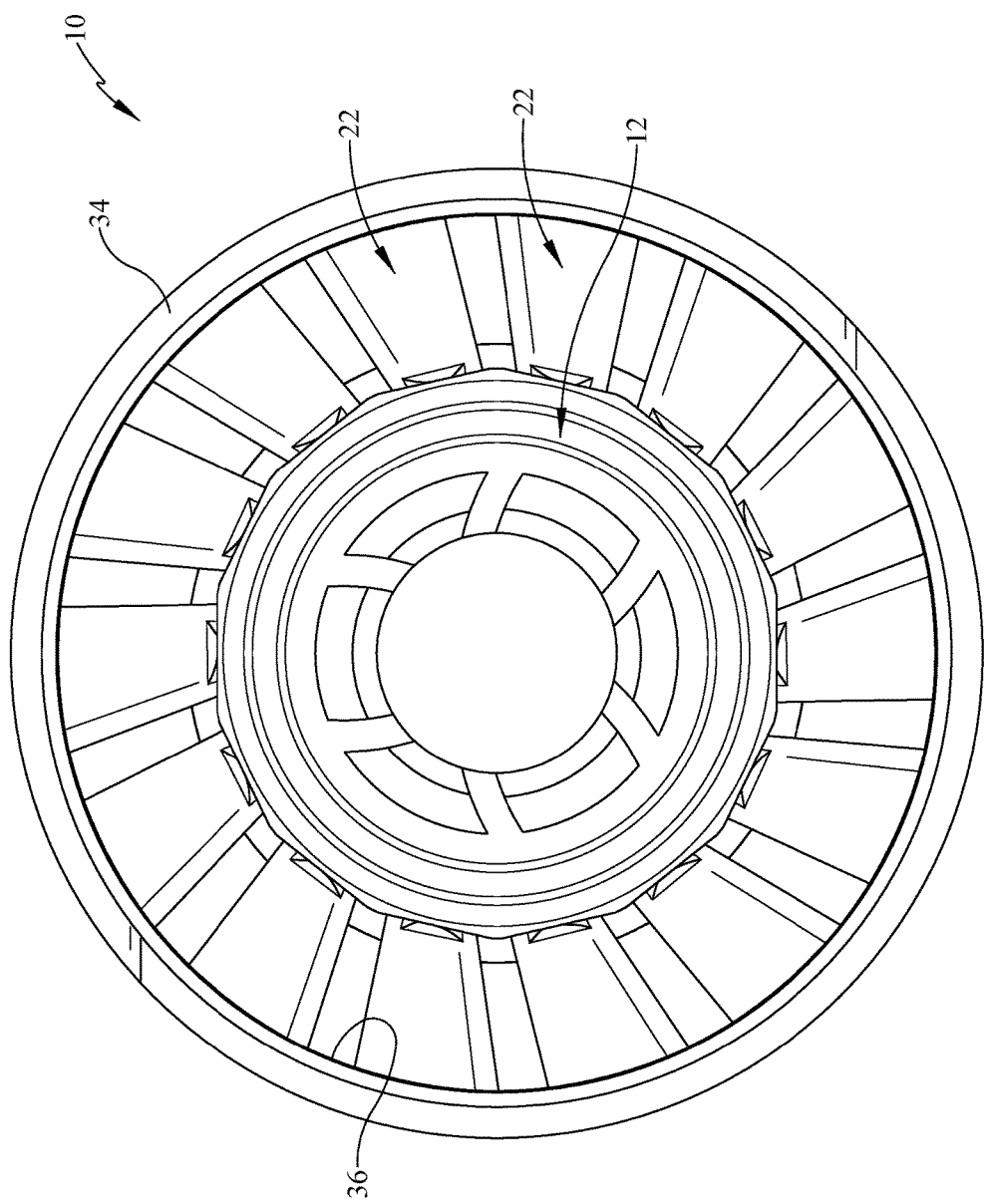
FIG. 6 is a top plan view of the torque converter stator having interchangeable blades.
Figure 7:
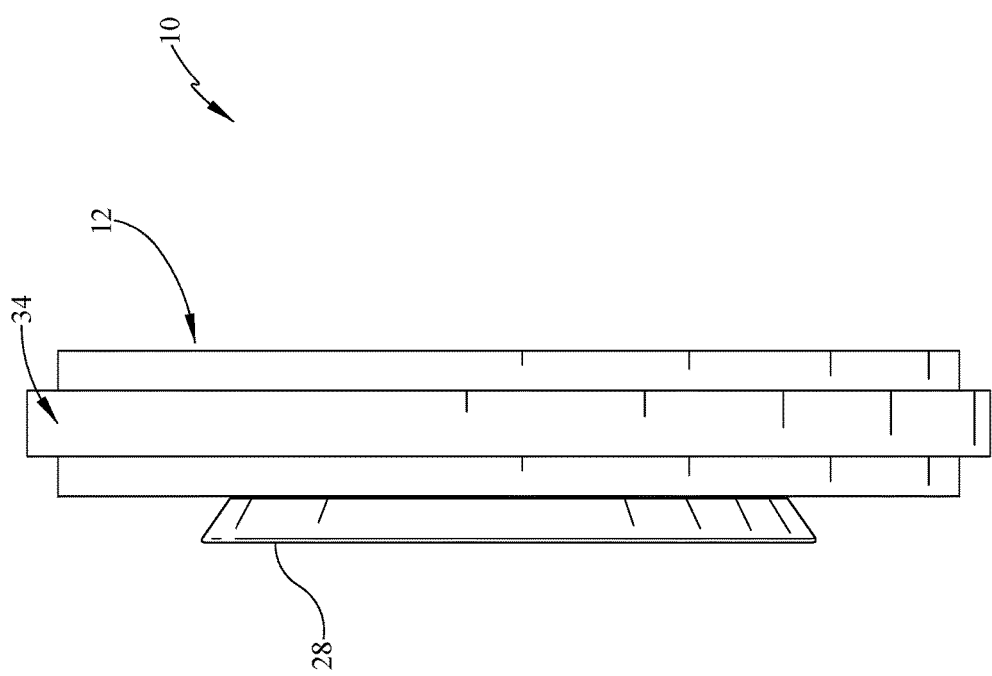
FIG. 7 is a side view of the torque converter stator having interchangeable blades.
Figure 8:
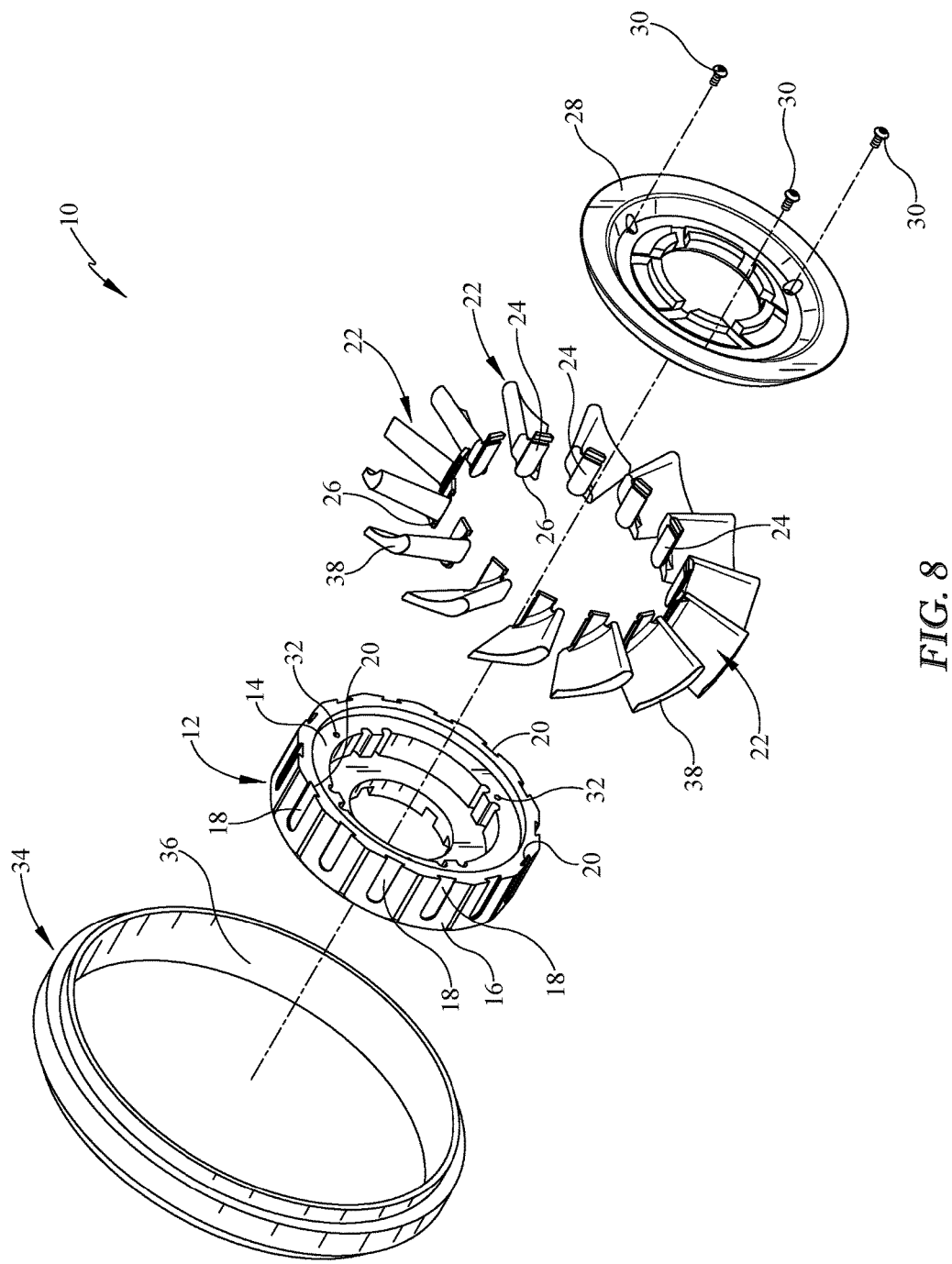
FIG. 8 is a fully exploded perspective view of the torque converter stator having interchangeable blades.

Referring now to the drawings, it is seen that the torque converter stator having interchangeable blades of the present invention, generally denoted by reference numeral 10, is comprised of a body member 12 that has a central hub portion 14 and an outer annular wall 16. As seen, a series of equidistantly spaced apart dovetail openings 18 encircle the annular wall 16, each dovetail opening 18 having an entry point or mouth 20. The body member 12, which is formed as a single monolithic unit, is made from a high strength material such as steel or titanium or similar material.

A series of blades 22 are provided, each having a dovetail pin 24 located at its base. The blade 22 and its dovetail pin 24 are formed as a single monolithic and are each made from a light yet strong material such as aluminum or titanium or similar material. Each blade 22 is attached to the body member 12 by positioning the distal end 26 of the dovetail pin 24 at the mouth 20 of the dovetail opening 18 on the body member 12 and sliding the dovetail pin 24 fully into the dovetail opening 18. Each blade 22 is similarly attached to the body 12 until all of the dovetail openings 18 have received a dovetail pin 24 of a blade 22. As this is a dovetail receiving system, each blade 22 can be detached from the body member 12 only by sliding its dovetail pin 24 back out of the mouth 20 of the dovetail opening 18. As such, in order to properly maintain each blade 22 attached to the body member 12, a cover plate 28 is attached to the body member 12 via appropriate screws 30 that are each passed through the cover plate 28 and are received within an appropriate screw boss 32 or opening located on the body member 12. Although each dovetail pin 24, once inserted into its respective dovetail opening 18, is friction fit maintained therein, the diameter of the cover plate 28 is at least as great as the outer diameter of the body member 12 so that when the cover plate 28 is attached to the body member 12, the mouth 20 of each dovetail opening 18 is covered by the cover plate 28 so that the dovetail pins 24 cannot slide out of their respective dovetail opening 18 so as to maintain the blade 22 properly and firmly attached to the body member 12. The cover plate 28 can be made from an appropriate lightweight material such as aluminum, titanium, or similar material.

A duct ring 34, made from an appropriate lightweight material such as aluminum, titanium, or similar material, is provided.

In order to use the torque converter stator having interchangeable blades 10 of the present invention, the desired blades 22 are selected and each blade 22 is attached to the body member 12 as described by sliding the blade's dovetail pin 24 into a dovetail opening 18 through the mouth 20 of the dovetail opening 18. Once all blades 22 are attached to the body member 12, the blades 22 are secured thereto by attaching the cover plate 28 to the body member 12 and securing it to the body member 12 via the screws 30.

Thereafter, the duct ring 34 is heated sufficiently to so that it expands and enlarges its inside diameter so that this inside diameter is slightly greater than the outside diameter of the body member 12 and blade 22 assembly. Thereafter, the duct ring 34 is positioned so that its inside wall 36 is positioned over the ends 38 of each blade 22 and the duct ring 34 is allowed to cool. As the duct ring 34 cools, it shrinks slightly so that its inside wall 36 shrinks onto the ends 38 of each blade 22 and the duct ring 34 is compressively held thereat.

If the blades 22 need to be changed, such as a change of the pitch of the blades 22 to accommodate a retuned or a different engine, the duct ring 34 is again heated in order to enlarge the duct ring 34 so that the duct ring 34 can slip off of the ends 38 of the blades 22. The cover plate 28 is detached from the body member 12. The blades 22 are detached from the body member 12 by sliding each blade's dovetail pin 24 out of the mouth 20 of its respective dovetail opening 18. Thereafter, new blades 22 are attached to the body member 12 and the stator is reassembled as described above.

The torque converter stator having interchangeable blades 10 of the present invention otherwise operates in typical stator fashion so that little to no modification is required when installing the torque converter stator having interchangeable blades 10 into an existing torque converter (not illustrated).

While the invention has been particularly shown and described with reference to an embodiment thereof, it will be appreciated by those skilled in the art that various changes in form and detail may be made without departing from the spirit and scope of the invention.

We claim:

1. A torque converter stator comprising:
   a body member having a central hub and an annular wall, the annular wall having an outer surface such that a series of spaced apart dovetail openings are located on the outer surface of the annular wall and such that each dovetail opening has a mouth defining an entrance into the dovetail opening;
   a series of blades, each blade having a dovetail pin and an outer end and such that each dovetail pin is slid into a respective one of the dovetail openings on the body member through the dovetail opening's mouth, such that when the dovetail pin is fully received within its dovetail opening, the dovetail pin is held thereat in dovetail fashion; and
   a duct ring having an inner wall such that the duct ring is removably attached to the outer end of each of the series of blades by having the inner wall contact each of the ends of the series of blades.

2. The torque converter stator as in claim 1 further comprising a cover plate removably attached to the body member such that the cover plate overlays the mouth of each of the series of dovetail openings.

3. The torque converter as in claim 1 wherein each of the series of blades are made from aluminum or titanium.

4. The torque converter as in claim 1 wherein the duct ring is made from aluminum or titanium.

5. The torque converter stator as in claim 1 wherein the cover plate is made from aluminum or titanium.

6. The torque converter stator as in claim 1 wherein the body member is made from steel, aluminum, or titanium.

* * * * *